United States Patent
Bainbridge et al.

[11] Patent Number: 6,024,522
[45] Date of Patent: Feb. 15, 2000

[54] SECURITY FASTENER AND DRIVE TOOL FOR DRIVING BOTH SECURITY FASTENERS AND CONVENTIONAL FASTENERS

[75] Inventors: Gary R. Bainbridge, North Tonawanda; Jeffery R. Sullivan, Boston, both of N.Y.

[73] Assignee: McGard, Inc., Orchard Park, N.Y.

[21] Appl. No.: 08/850,830

[22] Filed: May 2, 1997

Related U.S. Application Data

[63] Continuation-in-part of application No. 08/847,378, Apr. 24, 1997.

[51] Int. Cl.[7] ............................. F16B 23/00; F16B 37/14
[52] U.S. Cl. ............................. 411/410; 411/911; 411/429
[58] Field of Search ....................... 44/410, 910, 402, 44/403, 407, 427; 411/911, 429

[56] References Cited

U.S. PATENT DOCUMENTS

| | | | |
|---|---|---|---|
| 1,071,796 | 9/1913 | Reichardt . | |
| 2,375,249 | 5/1945 | Richer | 411/410 |
| 3,134,292 | 5/1964 | Walton | 411/910 |
| 3,302,672 | 2/1967 | Walton | 411/911 |
| 3,929,152 | 12/1975 | Graham . | |
| 4,223,585 | 9/1980 | Barth et al. . | |
| 4,569,259 | 2/1986 | Rubin | 411/402 |
| 4,616,535 | 10/1986 | Chiavon | 411/410 |
| 4,712,586 | 12/1987 | McCauley et al. . | |
| 4,945,789 | 8/1990 | Martinengo . | |
| 5,251,520 | 10/1993 | Lanham . | |
| 5,449,260 | 9/1995 | Whittle | 411/410 |

FOREIGN PATENT DOCUMENTS

| | | | |
|---|---|---|---|
| 4126539 | 2/1993 | Germany . | |
| 29606408 | 6/1996 | Germany . | |
| 892442 | 3/1962 | United Kingdom | 411/410 |
| 2149872 | 6/1985 | United Kingdom . | |

*Primary Examiner*—Flemming Saether
*Attorney, Agent, or Firm*—Joseph P. Gastel

[57] ABSTRACT

A security fastener including a body having a circumferential periphery and an end wall, a curvilinear groove in the end wall, a plurality of circumferentially spaced depressions extending inwardly into said circumferential periphery from said end wall and having a bottom wall and first and second side walls, junctions having radii between the bottom wall and the side walls. One of the side walls extends at a greater angle to the axis of the fastener than the other side wall, which is engaged by the driving tool. A driving tool for driving both the foregoing security fastener and a conventional hexagonal fastener including a body having a bore with a plurality of axially extending splines for selectively engaging either the above-mentioned side wall of the depression of the security fastener or a plurality of sides of the hexagonal fastener.

21 Claims, 5 Drawing Sheets

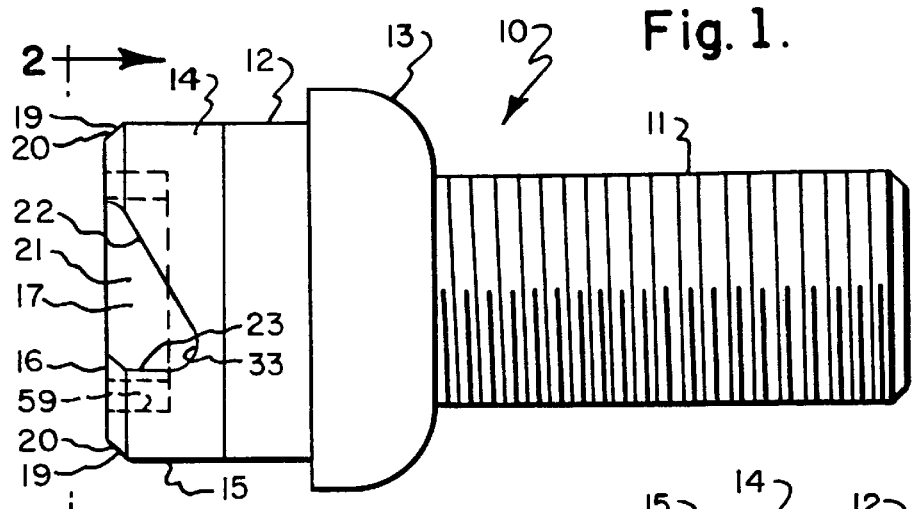
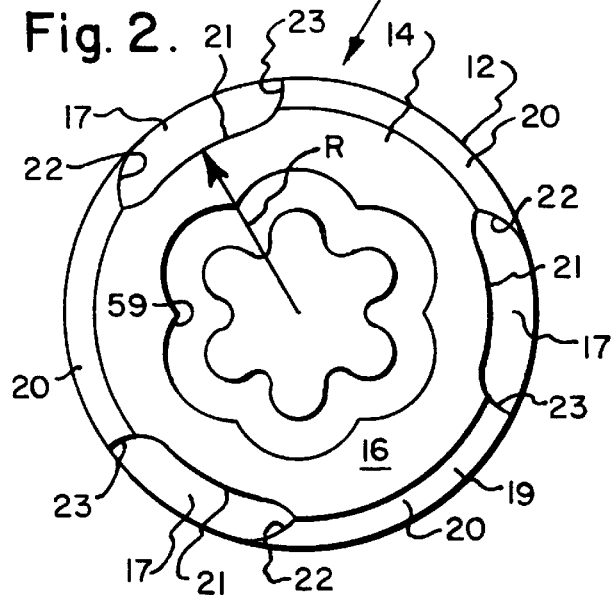
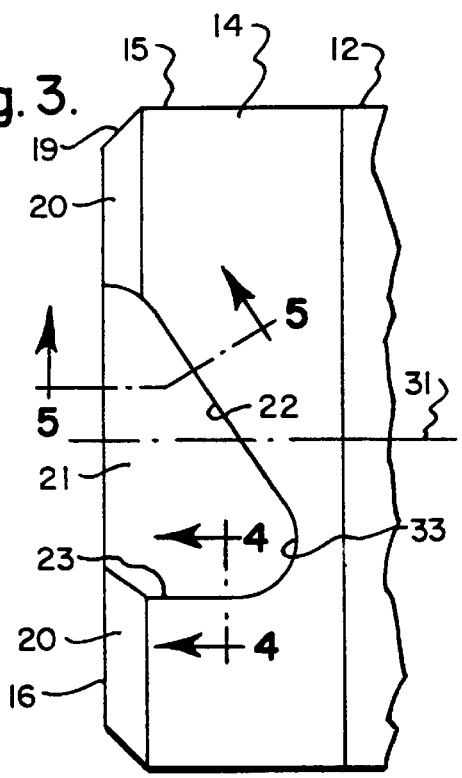
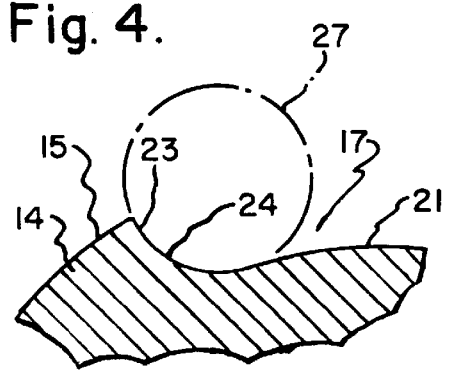
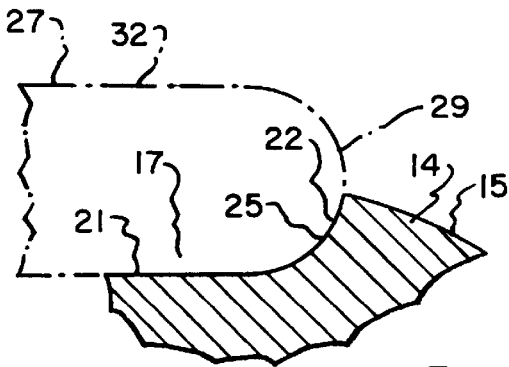

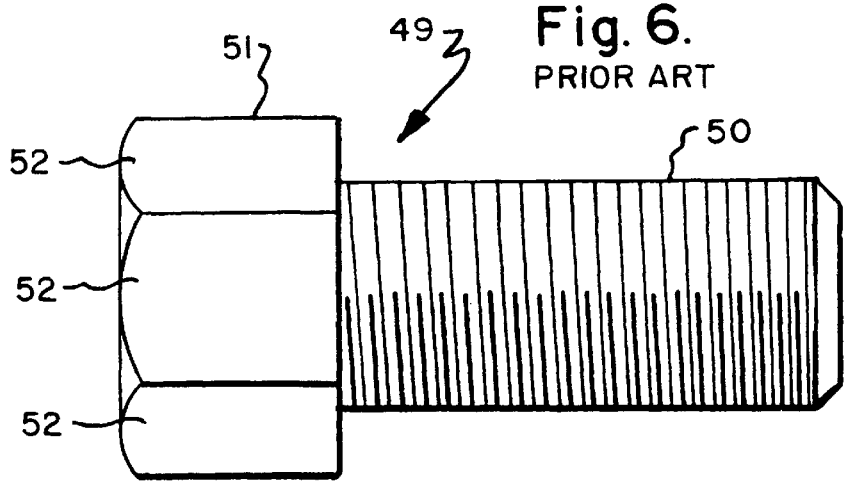
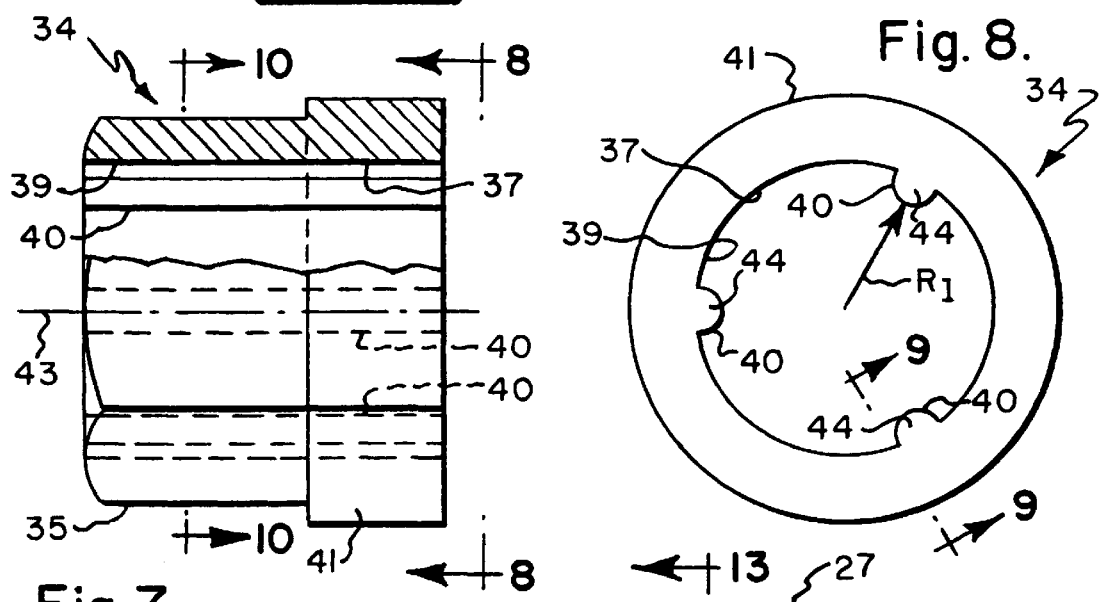
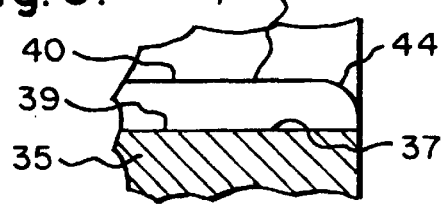
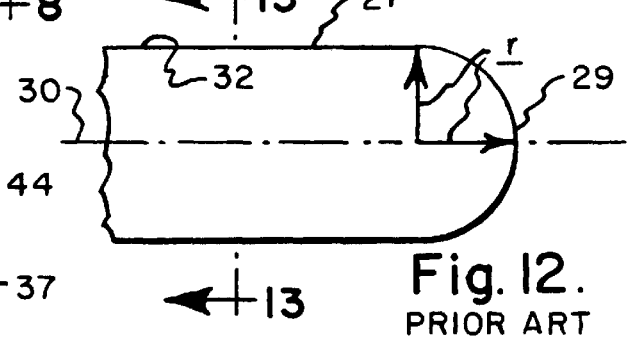
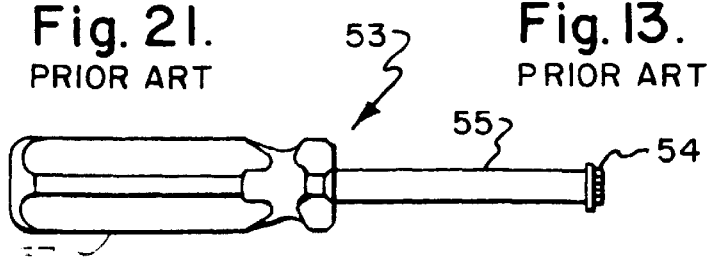
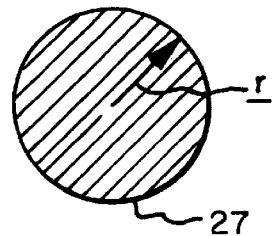

6,024,522

SECURITY FASTENER AND DRIVE TOOL FOR DRIVING BOTH SECURITY FASTENERS AND CONVENTIONAL FASTENERS

CROSS-REFERENCE TO RELATED APPLICATIONS

The present application is a continuation-in-part of application Ser. No. 08/847,378 filed Apr. 24, 1997, pending.

STATEMENT REGARDING FEDERALLY SPONSORED RESEARCH OR DEVELOPMENT

Not Applicable

BACKGROUND OF THE INVENTION

The present invention relates to an improved security type fastener and to a tool for driving this fastener and also a conventional hexagonal fastener.

In the past, there have been various types of security fasteners. Certain of these types of fasteners, such as shown in U.S. Pat. No. 4,712,586, could be driven to a fastening position by a special type of tool, but this tool could not be used to drive conventional fasteners, such as the type having a hexagonal outer configuration. Furthermore, there have been known driving tools, such as shown in U.S. Pat. No. 5,127,289, which could drive both conventional hexagonal configuration fasteners and security fasteners, but this type of tool required two separate structures to drive a security fastener and a hexagonal type of fastener. Insofar as known, there have been no security fastener and tool configurations wherein the same structure of the tool could drive a security fastener to a fastening position and also drive a conventional hexagonal type of fastener.

BRIEF SUMMARY OF THE INVENTION

It is one object of the present invention to provide an improved tool which can be utilized for both driving a security type of fastener to a fastening position and also drive a conventional hexagonal type of fastener.

Another object of the present invention to provide a security fastener which provides a very stable meshing engagement between its outer periphery and its associated driving tool.

A further object of the present invention is to provide an improved security fastener wherein the portions which are engaged by its associated driving tool do not have any critical stress points therein, by virtue of the fact that there are radii at the junctions of the portions of the security fastener which are engaged when it is driven to a fastening position. Other objects and attendant advantages of the present invention will readily be perceived hereafter.

The present invention relates to a security fastener comprising a body, a circumferential periphery on said body, an end wall extending transversely to said circumferential periphery, a plurality of spaced tightener-receiving depressions in said circumferential periphery, and a key-receiving configuration in said end wall.

The present invention also relates to a wrench for driving both a conventional multi-sided fastener having outer sides and a security-fastener having a plurality of depressions in the outer periphery thereof and a first wall in each of said depressions comprising a body having a second wall, a bore in said body defined by said second wall, a plurality of splines extending inwardly into said bore from said second wall for engaging said first walls when said splines are in said depressions and for engaging said outer sides of said conventional multi-sided fastener when said multi-sided fastener is located within said bore.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a side elevational view of a bolt type of security fastener having a head with the improved security construction of the present invention;

FIG. 2 is an end elevational view taken substantially in the direction of arrows 2—2 of FIG. 1;

FIG. 3 is an enlarged fragmentary side elevational view of the head portion of FIG. 1;

FIG. 4 is a fragmentary cross sectional view taken substantially along line 4—4 of FIG. 3 and showing the configuration of one of the side walls of the depression;

FIG. 5 is a fragmentary cross sectional view taken substantially along line 5—5 of FIG. 3 and showing the configuration of the other of the side walls of the depression;

FIG. 6 is a side elevational view of a conventional bolt having a hexagonal head;

FIG. 7 is a side elevational view, partially broken away, and showing a tool for driving both the security fastener of FIGS. 1–5 and the conventional hexagonal bolt of FIG. 6;

FIG. 8 is an end elevational view of the tool of FIG. 7 taken substantially in the direction of arrows 8—8 of FIG. 7;

FIG. 9 is an enlarged fragmentary cross sectional view taken substantially along line 9—9 of FIG. 8;

FIG. 12 is a schematic fragmentary side elevational view showing the external contour of the milling cutter which is utilized to form the depressions in the security head of the fastener of FIGS. 1–5;

FIG. 13 is a schematic cross sectional view taken substantially along line 13—13 of FIG. 12 and showing the cross section of the milling cutter;

FIG. 21 is a reduced side elevational view of a key which is used to turn any of the fastener embodiments of the present invention;

DETAILED DESCRIPTION OF THE INVENTION

Figure 22:
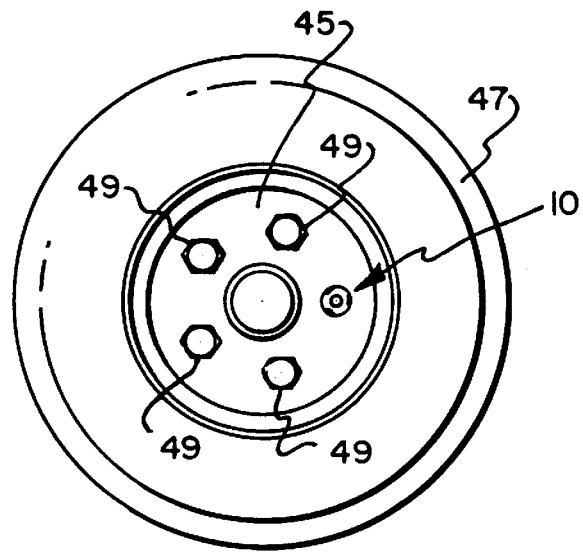
FIG. 22 is a side elevational view of a wheel having a rim which is mounted by a plurality of conventional bolts and a security bolt of the present invention.
Figure 19:
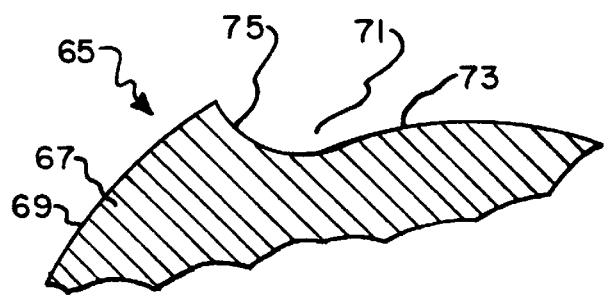
FIG. 19 is a enlarged fragmentary cross sectional view taken substantially along line 19—19 of FIG. 18.
Figure 20:
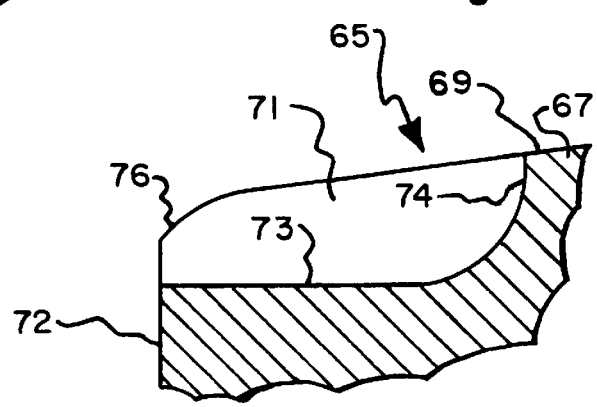
FIG. 20 is an enlarged fragmentary cross sectional view taken substantially along line 20—20 of FIG. 18.

Summarizing briefly in advance, the improved security fasteners of FIGS. 1–5 and 14–19 and the conventional hexagonal head type of fastener of FIG. 6 can be installed by the use of the same type of tool shown in FIGS. 7–9, and this is of great benefit in installations such as shown in FIG. 22 wherein a wheel is mounted on a rim by a plurality of conventional bolts of the type shown in FIG. 6 and a security bolt of the type shown in FIG. 1, thereby obviating the necessity of requiring separate tools to install both types of fasteners.

The improved bolt type of security fastener 10 of FIGS. 1–5 includes a threaded shank 11 and a security head 12 with an enlarged annular collar 13 therebetween. The security head 12 includes a body 14 having an end wall 16 and an outer circumferential periphery 15 having a plurality of spaced wrench-receiving depressions 17 therein. The edge 19 of body 14 includes chamfers 20 between end wall 16 and circumferential periphery 15. The chamfers are also located between depressions 17.

The wrench-receiving depressions 17 extend inwardly into body 14 from end wall 16 and include a bottom wall 21 and side walls 22 and 23. The depressions 17 are of uniform depth substantially throughout their extent, and bottom wall 21 is formed on a radius R (FIG. 2) which is consistent with the uniformity of the depth of each depression 17. The junction of bottom wall 21 with wall 23 has a radius, as shown at 24 (FIG. 4), and the junction between side wall 22 and bottom wall 21 has a radius at 25 (FIG. 5). There is also a radius at junction 33 (FIG. 3) between side walls 22 and 23. The radii at junctions 24, 25 and 33 eliminate stress points which would otherwise exist if these junctions were sharp.

The wrench-receiving depressions 17 are formed by a milling cutter 27, schematically shown in FIGS. 4, 5, 12 and 13, having a radius r and having a spherical end 29 which also has a radius r. The milling cutter 27 forms each depression 17 by being fed axially into body 14 with the axis 30 of the milling cutter 27 extending parallel to the longitudinal axis 31 (FIG. 3) of the body 14 of security head 12, which is also the longitudinal axis of fastener 10. As is well understood in the art, the milling cutter 27 is fed in to the body 14 to generate a depression 17 of the configuration shown in FIGS. 2–5. The milling cutter 27 will inherently generate the radii 24 and 25. In this respect the radius at 24 is generated by the longitudinal edge 32 of cutter 27, and the radius 25 is generated mostly by the spherical end 29 of cutter 27. In addition to the radii at 24 and 25, as noted above, there is a radius at 33 (FIG. 3) at the junction of side walls 22 and 23. The radius r of the milling cutter 27 is preferably slightly larger than the depth of depressions 17.

By way of example, in a security fastener 10 which was fabricated, radius R was 0.336 inches and the depth of depressions 17 was 0.0545 inches, and depressions 17 had a circumferential length of about 60° and were spaced apart about 60°. The grooves extended axially into the circumferential periphery about 0.195 inches at the maximum point, that is to junction 33 (FIG. 3). The radius of cutter 27 was 0.0625 inches. Also, the side walls 22 and 23 were inclined to end wall 16 at substantially the angles shown in FIG. 3. In this respect, side wall 22 is inclined to end wall 16 at approximately 25°, and side wall 23 is substantially perpendicular to end wall 16. It will be appreciated that other suitable dimensions may be used.

The fastener 10 is installed by use of a tool 34 having a body 35 with a bore 37 therein having an internal wall 39 with a plurality of longitudinally extending splines 40 projecting inwardly therefrom. One end of body 35 is formed into an annular collar 41 and the remainder of body 35 has an outer configuration in the shape of a hexagon for being mounted into a mating recess of a suitable driver for turning tool 34.

In order to drive security fastener 10 to a installed position, it is merely necessary to advance tool 34 axially with its axis 43 in alignment with longitudinal axis 31 of security head 12. The curved ends 44 (FIG. 9) of splines 40 will either enter depressions 17 or abut chamfers 20. If they abut chamfers 20, they will be rotated relative thereto until they enter depressions 17. When they enter depressions 17, they will advance inwardly until curved ends 44 of the splines engage side walls 22 of the depressions 17. It is to be noted that the curvature 44 at the ends of splines 40 approximates the concave curvature of side walls 22 and they will pass axially along the side walls until they reach junctions 33. The curvature of the walls of the splines at 45 is of substantially the same radius as concavely curved walls 23 so that they will engage walls 23, which function as a shoulder, in substantially complementary mating relationship to thereby drive fastener 10 to a locking position.

Figure 10:
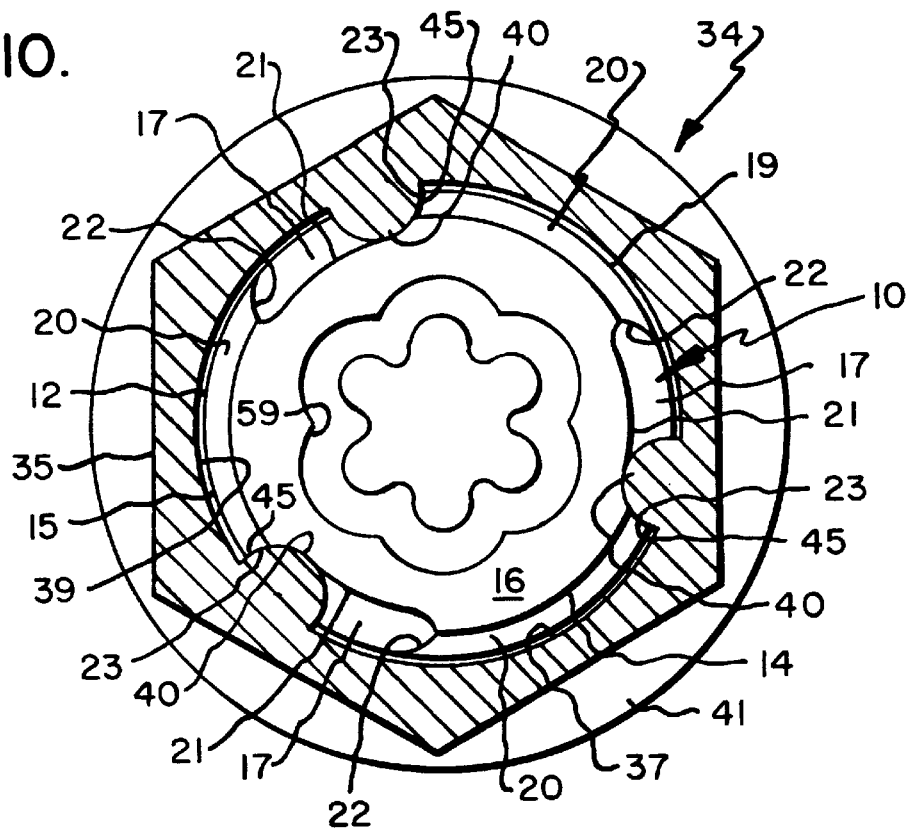
FIG. 10 is a cross sectional view taken substantially along line 10—10 of FIG. 7 but showing the driving tool in fastener-tightening driving relationship with the security head of the fastener of FIG. 1.

After fastener 10 has been fully installed, the tool 34 is withdrawn axially. The driving relationship between tool 34 and the security head 12 of fastener 10 is depicted in FIG. 10 wherein the sides 45 of splines 40 engage side walls 23 of depressions 17. It is also to be noted that the radius $R_1$ (FIG. 8) from the axis 43 of tool 34 to the innermost edge of each spline 40 is only sightly larger than the radius R of bottom wall 21 of each depression 17 so that the splines 40 will ride along bottom walls 21 until they engage side walls 23 of depressions 17. Thus, tool 34 can drive security fastener 10 into rim 45 (FIG. 22) which mounts tire 47.

Figure 11:
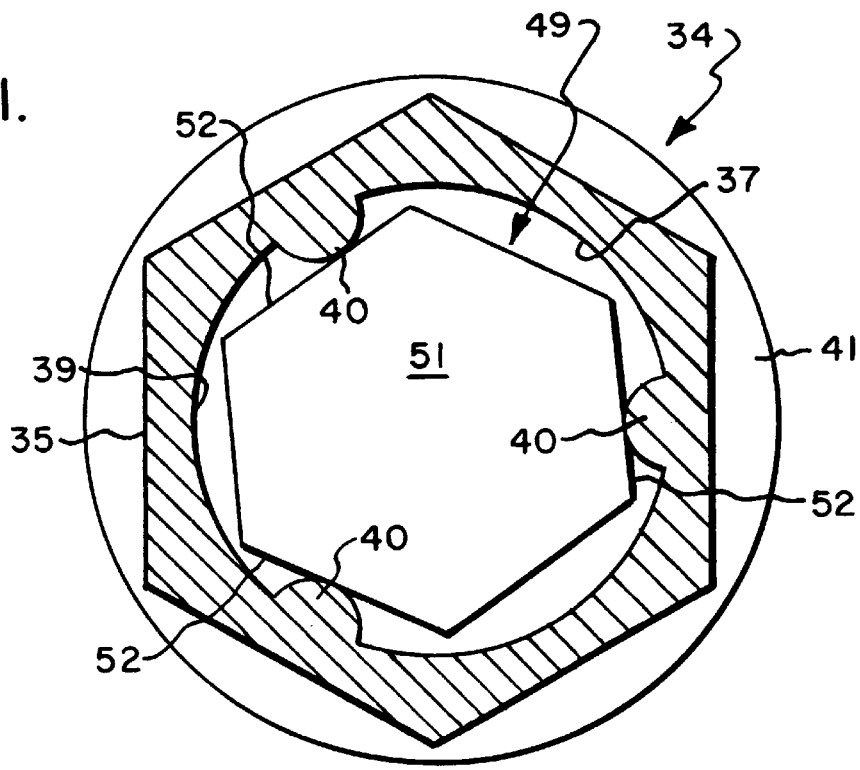
FIG. 11 is a cross sectional view taken substantially along line 10—10 of FIG. 7 and showing the driving tool in fastener-tightening driving relationship with the hexagonal head of the prior art fastener of FIG. 6.
Figure 14:
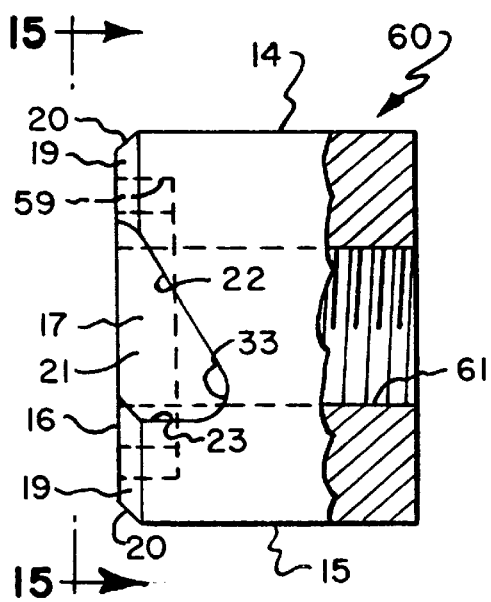
FIG. 14 is a side elevational view, partially broken away, showing a nut type of fastener having the improved security structure of the present invention.
Figure 15:
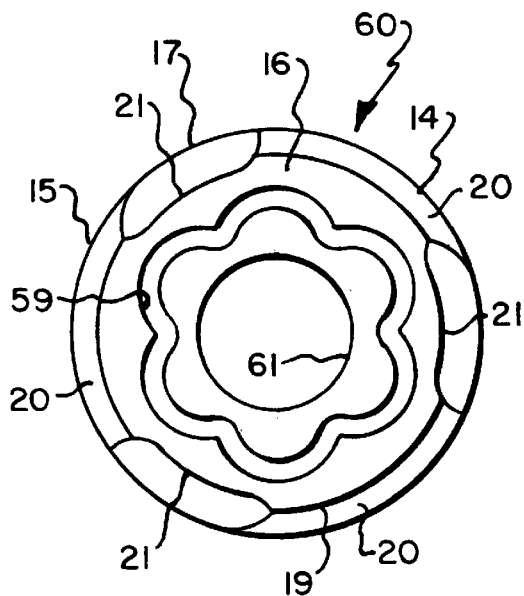
FIG. 15 is an end elevational view taken substantially in the direction of arrows 15—15 of FIG. 14.
Figure 16:
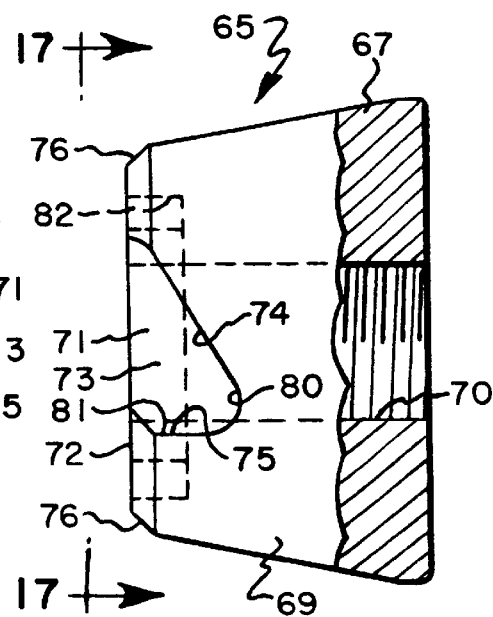
FIG. 16 is a side elevational view, partially broken away, of another type of nut type of fastener having the security construction of the present invention.

As expressed briefly above, the tool 34 is also utilized to drive conventional fasteners 49 (FIG. 6) which consist of a threaded shank 50 having a conventional hexagonal head 51 at its end. In order to drive fastener 49 to an installed position it is merely necessary to insert hexagonal head 51 into bore 37 of tool 34 such that splines 40 engage sides 52 of hexagonal head 51 in driving relationship as shown in FIG. 11. It will be appreciated that there is a sufficient clearance between sides 52 and splines 40 during the assembly of tool 34 onto head 51.

It can thus be seen that the same tool 34 can conveniently be utilized to drive both a security fastener 10 and a plurality of conventional hexagonal head fasteners 49 into a rim 45, as depicted in FIG. 22.

In order to remove a security fastener 10 from an installed position, a key 53 is utilized which has a curvilinear ridge 54 at the end of shank 55 mounted on handle 57. The curvilinear ridge 54 is of complementary mating shape to curvilinear groove 59 in end wall 16 of body 14. Keys such as 53 for use with curvilinear grooves such as 59 are well known and conventional in the art, as are the curvilinear grooves. The curvilinear groove 59 is the preferred type of key-receiving configuration which is utilized in the present structure. However, it will be appreciated that other types of key-receiving configurations may be incorporated into the security fasteners of the present invention.

While the security fastener 10 of FIGS. 1, 2 and 5 have been shown to be in the nature of a bolt, it will be appreciated that the security fastener can also be in the nature of a nut 60 (FIGS. 14 and 15) which differs only from security fastener 10 of FIG. 1 in that it has an internal threaded bore 61 rather than a threaded shank 11. Accordingly, the same numerals will be applied to the body 14 of nut 60 as were applied to the body 14 of fastener 10, and it is deemed that the description of these portions of the structure is unnecessary inasmuch as they were fully described above relative to FIGS. 1–5.

Figure 17:
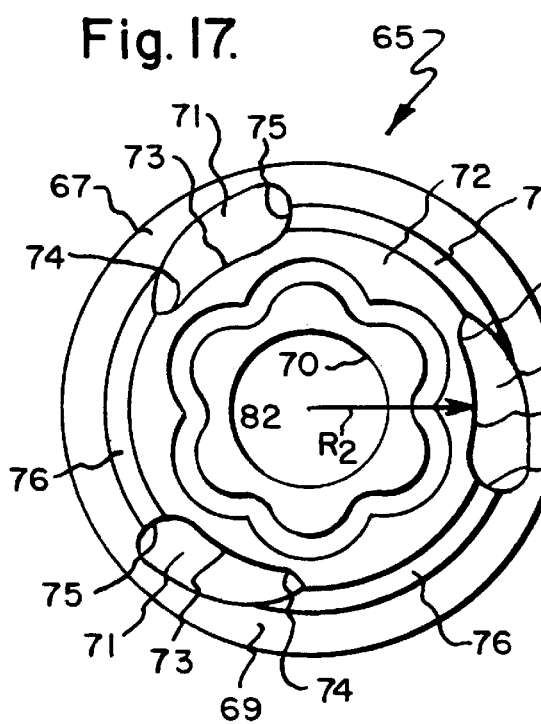
FIG. 17 is an end elevational view taken substantially in the direction of arrows 17—17 of FIG. 16.
Figure 18:
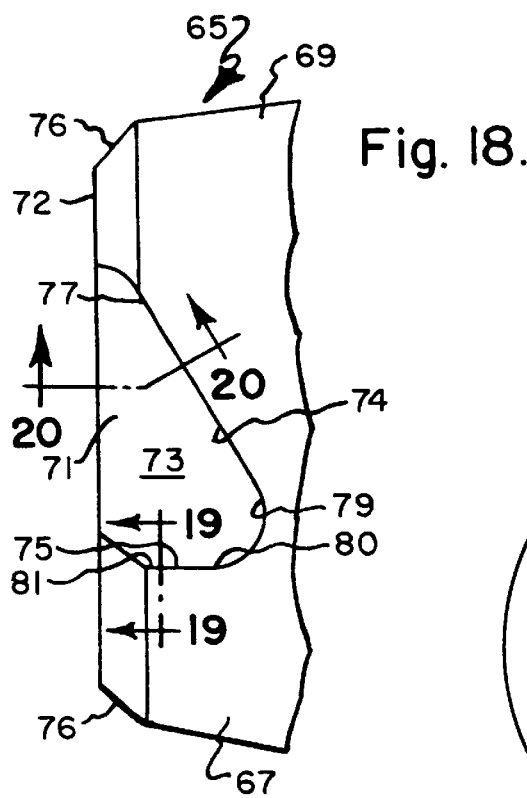
FIG. 18 is a fragmentary enlarged view of a portion of FIG. 16.

In FIGS. 16–20 another embodiment of a security fastener 65 is disclosed which has a body 67 having a circumferential periphery 69 of frustoconical configuration. Security fastener 65 is in the nature of a nut having an internal threaded bore 70. However, while not shown, it will be appreciated that the security fastener can be in the nature of a bolt if the threaded bore 70 were replaced by a threaded shank, such as shown in FIG. 1. The circumferential periphery 69 has a plurality of depressions 71 therein. Depressions 71 extend inwardly into body 67 from end wall 72, and they are formed in the same manner as depressions 17 of FIGS. 1 and 15, namely, by running a milling cutter into the end wall 72 with the axis of the milling cutter substantially parallel to the longitudinal axis of the fastener, as described above relative to the embodiment of FIGS. 1–5. Chamfers 76 are located between end wall 72 and circumferential periphery 69 and they are also located between depressions 71. Each of the depressions has a bottom wall 73 which is formed on a radius $R_2$ (FIG. 17). Bottom wall 73 is bounded by side walls 74 and 75. As can be visualized from FIG. 17, side wall 74 is not of uniform height. More specifically, because of the frustoconical configuration of outer periphery 69, the end portion 77 (FIG. 18) of end wall 74 is of less height than end portion 79. Also the portion 80 of end wall 75 is higher than portion 81 which is closer to end wall 72.

While it is preferred to drive the fastener 65 by a tool which is of complementary mating relationship to the walls of depressions 71, a tool such as shown and described relative to FIGS. 7–9 can also be used but the contact between the splines, such as 40, and the wall 75 would not be as complete as it is with a configuration such as shown in FIGS. 1–5. The security fastener of FIGS. 16–20 is unfastened by using a key, such as 53 (FIG. 21), which effects a complementary mating engagement with curvilinear groove 82.

A tool 34 cannot be used to unfasten security fasteners 10, 60 or 65 because if it is inserted into the depressions 17 or 71 of these fasteners and rotated in an unfastening direction, such as counterclockwise in FIG. 10, the splines 40 will merely ride along sides 22 or 74 without unfastening the fasteners. Furthermore, the head 12 of fastener 10, and the outer periphery of fastener 60 are sufficiently hard so that they cannot be gripped easily with a wrench. Also, the frustoconical periphery of fastener 65, in addition to being hard, cannot be gripped by a conventional wrench. Also, if a tool is pressed against side walls 22 of fasteners 10 and 60 or side wall 74 of fastener 65 in an attempt to drive these fasteners in a counterclockwise unfastening direction, it will merely slide along the side walls without turning the fasteners.

While preferred embodiments of the present invention have been disclosed, it will be appreciated that the present invention is not limited thereto but may be otherwise embodied within the scope of the following claims.

We claim:

1. A security fastener comprising a body, a circumferential periphery on said body, an end wall extending transversely to said circumferential periphery, a plurality of spaced wrench-receiving depressions in said circumferential periphery, and a key-receiving configuration in said end wall, said wrench-receiving depressions extending axially from said end wall into said circumferential periphery, said wrench-receiving depressions being bounded by a bottom wall and first and second side walls which extend axially into said circumferential periphery from said end wall, said first and second side walls converging in a direction away from said end wall and having adjacent portions remote from said end wall, and said bottom wall being formed on a substantially constant radius and extending both axially and circumferentially on said body.

2. A security fastener as set forth in claim 1 including junctions having radii between said bottom wall and said first and second side walls.

3. A security fastener as set forth in claim 1 including a chamfer between said end wall and said circumferential periphery.

4. A security fastener as set forth in claim 3 including junctions having radii between said bottom wall and said first and second side walls.

5. A security fastener as set forth in claim 1 wherein said key-receiving configuration is a curvilinear groove.

6. A security fastener as set forth in claim 5 including junctions having radii between said bottom wall and said first and second side walls.

7. A security fastener as set forth in claim 6 including a chamfer between said end wall and said circumferential periphery.

8. A security fastener as set forth in claim 1 wherein said first and second walls are concavely curved.

9. A security fastener comprising a body having an axis and a circumferential periphery, an end wall on said body extending transversely to said circumferential periphery, a plurality of circumferentially spaced depressions in said circumferential periphery, each of said depressions being defined by first and second side walls and a bottom wall, each of said first side walls having a first end proximate said end wall and a second end located inwardly along said circumferential periphery from said end wall, each of said second side walls having a first end proximate said second end of said first wall and a second end proximate said end wall, said first side wall being inclined at a larger angle to said axis than said second side wall, each of said depressions extending axially and circumferentially onto said circumferential periphery from said end wall, a key-receiving configuration in said end wall, and first portions of each of said bottom walls adjacent each of said first side walls and remote from said second walls being no further from said axis than second portions of each of said bottom walls adjacent each of said second side walls.

10. A security fastener as set forth in claim 9 wherein said second wall extends substantially parallel to said axis.

11. A security fastener as set forth in claim 10 including a chamfer on said body between said end wall and said circumferential periphery.

12. A security fastener as set forth in claim 9 including a first radius between said first wall and said bottom wall, a second radius between said second wall and said bottom wall, and a third radius between said first and second walls.

13. A security fastener as set forth in claim 12 wherein said key-receiving configuration is a curvilinear groove.

14. A security fastener as set forth in claim 13 including a chamfer between said end wall and said circumferential periphery.

15. A security fastener as set forth in claim 14 wherein said second wall extends substantially parallel to said axis.

16. A security fastener as set forth in claim 12 including a chamfer between said end wall and said circumferential periphery.

17. A security fastener as set forth in claim 9 wherein said first and second walls are concavely curved.

18. A security fastener comprising a body, a circumferential periphery on said body, an end wall extending transversely to said circumferential periphery, a plurality of spaced wrench-receiving depressions in said circumferential periphery, a key-receiving configuration in said end wall, said wrench-receiving depressions extending axially from said end wall into said circumferential periphery, said wrench-receiving depressions being bounded by a bottom wall and first and second adjacent side walls which extend axially into said circumferential periphery from said end wall, and at least one of said first and second side walls being concavely curved.

19. A security fastener as set forth in claim 18 wherein both of said first and second side walls are concavely curved.

20. A security fastener as set forth in claim 19 wherein said second side wall extends substantially parallel to said axis.

21. A security fastener as set forth in claim 18 including a chamfer between said end wall and said circumferential periphery.

* * * * *